(12) United States Patent
Morejon et al.

(10) Patent No.: US 7,236,534 B1
(45) Date of Patent: Jun. 26, 2007

(54) METHOD AND APPARATUS FOR NOISE REDUCTION BY SPECTRAL AND SUBCARRIER AVERAGING

(75) Inventors: Israel Morejon, St. Petersburg, FL (US); Jwalant Dholakia, St. Petersburg, FL (US); Yueping Zeng, St. Petersburg, FL (US)

(73) Assignee: Jabil Circuit, Inc., St. Petersburg, FL (US)

( * ) Notice: Subject to any disclaimer, the term of this patent is extended or adjusted under 35 U.S.C. 154(b) by 740 days.

(21) Appl. No.: 10/605,933

(22) Filed: Nov. 6, 2003

Related U.S. Application Data (60) Provisional application No. 60/319,671, filed on Nov. 6, 2002.

(51) Int. Cl.
*H04K 1/10* (2006.01)
*H04B 1/10* (2006.01)

(52) U.S. Cl. ..................................... 375/260; 375/350
(58) Field of Classification Search ................ 375/260, 375/261, 346, 350
See application file for complete search history.

(56) References Cited

U.S. PATENT DOCUMENTS

| | | | |
|---|---|---|---|
| 5,539,832 A * | 7/1996 | Weinstein et al. | 381/94.1 |
| 5,914,931 A * | 6/1999 | Kang et al. | 370/203 |
| 6,219,561 B1 * | 4/2001 | Raleigh | 455/561 |
| 2002/0034337 A1 * | 3/2002 | Shekter | 382/275 |

* cited by examiner

*Primary Examiner*—Don N. Vo
(74) *Attorney, Agent, or Firm*—Molly Sauter; Smith & Hopen, P.A.

(57) ABSTRACT

The method and apparatus in accordance with the present invention provides signal-to-noise ratio improvement through noise reduction by means of spectral averaging and subcarrier based averaging techniques.

10 Claims, 11 Drawing Sheets

(1) $\quad N_{useful} = \dfrac{(N/2-1)}{K}$ (2) $\quad \sigma_{n'}^2 = \dfrac{1}{K}\sigma_n^2$ (3) $\quad SNR = \dfrac{\sigma_s^2}{\sigma_n^2}$ (4) $\quad SNR_{averaged} = K * SNR_o$ Where $SNR_o$ is the SNR of a particular carrier without using (5) $\quad b_i = \left\lfloor \log_2\left(1 + \dfrac{SNR_{averaged}}{\Gamma}\right) \right\rfloor$ Where $i$ is the sub-carrier index, and $\Gamma$ is the SNR gap. Moreover, operator $\lfloor \; \rfloor$ denotes the floor function.

(6) $\quad b_{frame} = \sum_{i=1}^{N_{useful}} b_i$ (7) $\quad R = R_s * b_{frame}$ Where $R_s$ is the DMT frame rate.

Fig. 10

$$(8) \quad b_i = \left\lfloor \log_2\left(1 + \frac{SNR}{\Gamma}\right) \right\rfloor$$

$$(9) \quad b_i = \frac{B}{R_s} \left\lfloor \log_2\left(1 + \frac{SNR}{\Gamma}\right) \right\rfloor$$

$$(10) \quad \sigma_{n'}^2 = \frac{1}{K}\sigma_n^2$$

$$(11) \quad SNR_{averaged} = K * SNR_o$$

$$(12) \quad b_{i,averaged} = \left\lfloor \frac{B}{R_s} \log_2\left(1 + \frac{SNR_{averaged}}{\Gamma}\right) \right\rfloor = \left\lfloor \frac{B}{R_s} \log_2\left(1 + K\frac{SNR_o}{\Gamma}\right) \right\rfloor$$

$$(13) \quad \frac{2^{\lfloor b \rfloor \frac{B}{R_s}}}{2^{\lfloor b_{avg} \rfloor \frac{B}{R_s}}} = 2 = \frac{\left(1 + K\frac{SNR_o}{\Gamma}\right)}{\left(1 + \frac{SNR_o}{\Gamma}\right)}$$

$$= \frac{\Gamma + K * SNR_o}{\Gamma + SNR_o}$$

Fig. 11

(14) $\quad 2\Gamma + 2SNR_o = \Gamma + K * SNR_o$ (15) $\quad K = \left(1 + \dfrac{\Gamma}{SNR_o}\right)$

METHOD AND APPARATUS FOR NOISE REDUCTION BY SPECTRAL AND SUBCARRIER AVERAGING

CROSS-REFERENCE TO RELATED APPLICATIONS

This application claims the benefit of U.S. Provisional Application No. 60/319,671 filed Nov. 6, 2002. The disclosure of the provisional application is incorporated herein by reference.

BACKGROUND OF INVENTION

1. Field of Invention

The present invention relates to the field of digital communications. More specifically, the present invention provides a method and apparatus to reduce the signal-to-noise ratio of a communication system and a method for data rate optimization in a multicarrier modulation framework.

2. Background of Invention

Modern communication systems involve complex modulation and transmission schemes. To achieve superior performance, systems have to be robust against noise and distortion as they are the prime limiting factors. Therefore, noise reduction and compensation for channel distortion have been of principle interest. Primarily, noise reduction can provide significant performance enhancement in applications including, but not limited to, wired and wireless communications, image processing and speech processing.

Removal or suppression of noise can be accomplished using several different approaches. One of the common approaches is data averaging. As is known in the art of data averaging, a signal is transmitted repeatedly over time. The data is received at the receiver periodically. While propagating through the transmission medium, the signal is corrupted by noise. Theoretically, the corrupting noise is random and its effects can be eliminated through averaging the signal over all repetitions. This corruptive random noise, commonly referred to as Additive White Gaussian Noise (AWGN), is well known in the art as a means of modeling noise in communication system analysis. In the presence of AWGN it is known in the art to substantially improve the signal quality through averaging. The averaging approach can also be helpful in the detection of information in extremely noisy environments. While deploying the noise averaging technique, a trade-off should be made between the number of repetitions and the amount of noise-reduction or signal-to-noise ratio (SNR) improvement.

In a typical information transmission system where the information sent out may be in the form of data, speech, or video, an efficient mechanism is required to segregate the signal and the noise. Moreover, to improve the link quality, it is often necessary to train the receiver before actual data transmission begins. In such cases, usage of noise reduction algorithms helps further to enhance the system performance by converging equalizer weights, providing faster convergence, enabling improved channel estimation and improved timing extraction.

In a communication system known in the art, the signal is modulated at the transmitter through a pre-determined modulation scheme, and is transmitted over a medium. The signal may be up-converted to RF frequency using a high frequency carrier signal. While propagating through the medium, the transmitted signal is distorted and is subjected to interferences. The receiver receives the signal at an antenna or front-end. The received signal then may undergo some frequency down-conversion and amplification before it is converted back to the baseband. Then, the majority of signal processing and detection is accomplished to extract the information. At this point, the receiver may also use de-noising or noise-reduction algorithms to improve the signal quality or SNR. After this pre-detection processing is completed, the transmitted information is deciphered by the detection stages.

While de-noising methods are known in the art, what is needed in the art is a method and apparatus addressing the issue of signal-to-noise ratio that provides a greater noise reduction of the received signal over the noise reduction algorithms known in the art.

SUMMARY OF INVENTION

The longstanding but heretofore unfulfilled need for an improved noise reduction method for system level design of a modem, which enables very high bit-rate transmission and long distance reach over the existing communication channel is now met by a new, useful, and nonobvious invention.

The present invention addresses the issue of SNR improvement by de-noising the signal. While the invention is not limited to only DMT (Discrete Multi-Tone) systems, the exemplary description and figures are for a DMT system typically used in a Digital Subscriber Line (DSL) framework. It is within the scope of the present invention to employ the methods described in both a single and a multicarrier modulation (MCM) system.

In accordance with one embodiment of the present invention, noise reduction takes place prior to signal detection. As described in detail below, the frame averaging stage, or averager, exemplifies the noise reduction scheme in accordance with the present invention.

The averaging stage in accordance with the present invention can accept discrete-time signals as input or it can sample the incoming signal itself. The sampling frequency in either case is the same or greater than the Nyquist frequency. For timing reference, an external system clock generally supplies the clock signal.

Using the DMT framework, prior to actual data transmission, based on channel estimation, noise power level and given performance requirements, optimum size of averaging can be determined. In accordance with the present invention, the averaging size is also referred to as the averaging interval. Once, the value of averaging interval is chosen, actual throughput or date rate can be easily found.

In an alternative embodiment, it is also demonstrated that one can follow a similar approach and average date over several frames in time to optimized the throughput for each subcarrier.

In a DMT transmission system as the loop length increases, high frequency attenuation is more pronounced. Hence, more and more subcarriers cannot be used for data transmission. The spectral averaging techniques in accordance with the present invention enable these subcarriers for data transmission. More specifically, during the data transmission, rather than sending the same data frame repeatedly over time, the method in accordance with the present invention transmits replicas of the same data over different frequencies. The method of the present invention is beneficial in DMT transmission, as bit loading and unloading is accomplished in the frequency domain. The method in accordance with the present invention utilizes the unused subcarriers to provide replicas of the information at the receiver. As a result, the method of the present invention provides a noise reduction technique that does not lower the date rate in order to improve the performance of the channel, nor does the method of the present invention use additional signal power to boost the performance. As such, the spectral averaging method in accordance with the present invention provides SNR improvement over other methods known in the art.

In an exemplary embodiment, let $D_1$ be the total available data-carrying subcarriers, and K be the averaging interval, then each DMT frame is going to carry $D_1/K$ data symbols, and each one of these symbols is sent on K different subcarriers. At the receiver, in accordance with the spectral averaging method of the present invention, distorted and noisy signals on these K subcarriers are averaged. The averaged value replaces the actual received samples on K subcarriers. As explained in detail below, the effective noise variance goes down by a factor of K. Thus, SNR at the detectors is improved by the method of the present invention.

In an additional embodiment of the present invention, multiple frames are used to improve SNR over a subcarrier. In accordance with this embodiment, a noise reduction method through subcarrier-based averaging is provided. It is known that longer loops suppress high frequencies and that subcarriers in high frequency bands will be unable to carry any data. In accordance with the sub-carrier-based averaging embodiment of the present invention, SNR of the suppressed carriers is improved through timed averaging.

In a typical MCM system, when the channel attenuates high frequency subcarriers, without any noise reduction technique, those subcarriers are suppressed and thus are wasted. In accordance with the method of the present invention, it is shown that through repetition of date over time, some of the suppressed subcarriers can be utilized with reasonable attenuation for data transmission purposes.

In accordance with this embodiment of the present invention, the effect of noise can be averaged out depending on the SNR conditions, equalization and cross-talk cancellation. Thus, effective SNR of the subcarriers can be improved. In turn, allowing a few bits to be carried on these subcarriers which increases the overall throughput of the system. Effectively, the method in accordance with the present invention improves the overall link performance through subcarrier based averaging. Additionally, in accordance with the present invention, an algorithm is provided to estimate an independent value of an averaging internal over various subcarriers.

An objective of the present invention is to improve SNR of the signal. In accordance with the present invention, the SNR is improved by reducing the amount of noise present in the signal.

An advantage of the present invention is the improved link quality that is established through the method of noise power reduction in accordance with the present invention, thereby increasing the overall system throughput.

Another advantage of the method in accordance with the present invention is the reduction in noise power spectral density (PSD) and thus a reduction in the total noise power of the system.

An additional advantage of the present invention is the applicability of the methods in accordance with the present invention to achieve noise reduction in both the frequency domain and the time domain within the DMT framework.

Another advantage of the present invention is the maximization of the system data rate by estimating the optimum-averaging interval individually for each subcarrier.

BRIEF DESCRIPTION OF DRAWINGS

For a fuller understanding of the nature and objects of the invention, reference should be made to the following detailed description, taken in connection with the accompanying drawings, in which.

DETAILED DESCRIPTION

As is known in the art, the concept of averaging can be applied to any data transmission system. Begin simple and economic, data averaging can help to improve the signal quality and therefore the overall system performance. For SNR improvement, the technique of noise reduction through averaging has been utilized in various fields like speech processing, imaging processing, medical imaging, etc.

As is know in the art, the averaging technique uses a repetitive signal to average and thus eliminate the effect of random additive noise. Therefore, the same data signal or frame must be transmitted several times to accomplish averaging. In some cases, it can result in improved link quality at the cost of decreased throughput. Certainly, increased overhead is not a desirable situation in a communication channel.

Several techniques are known in the art for SNR improvement. One known technique is diversity. With diversity the receiver can obtain signal replicas through multiple antennas or through reception in multiple frequency bands. In modern wireless communication systems diversity is extensively used. Another approach to SNR improvement known in the art is spectral subtraction, wherein the estimated noise spectrum is subtracted from the noisy signal spectrum.

The method and apparatus in accordance with the present invention provides SNR improvement through noise reduction by means of spectral averaging and subcarrier based averaging techniques. While various modulation techniques are within the scope of the present invention, a multicarrier modulation system is described by the following exemplary embodiments.

In accordance with the present invention some of the available subcarriers are used to carry the same data. This method provides an improvement in SNR in many cases. For example, in a DSL system, the twisted pair telephone line acts as a low pass filter. Therefore, as the loop length increase, high frequency attenuation is more severe. On these high frequency subcarriers, the signal is degraded by attenuation and additive noise. In such cases, commonly transmission is avoided on certain subcarriers. Sometimes, the attenuation is so severe that, the signal level is beneath the noise level (Noise Floor). In this situation, the SNR is negative. Therefore, the throughput or data rate is reduced.

In one embodiment of the present invention employing spectral averaging, averaging is performed of data carried by different subcarriers in the same frame.

In an additional embodiment of the present invention employing subcarrier averaging, several frames are used to perform the averaging operation.

Figure 1:
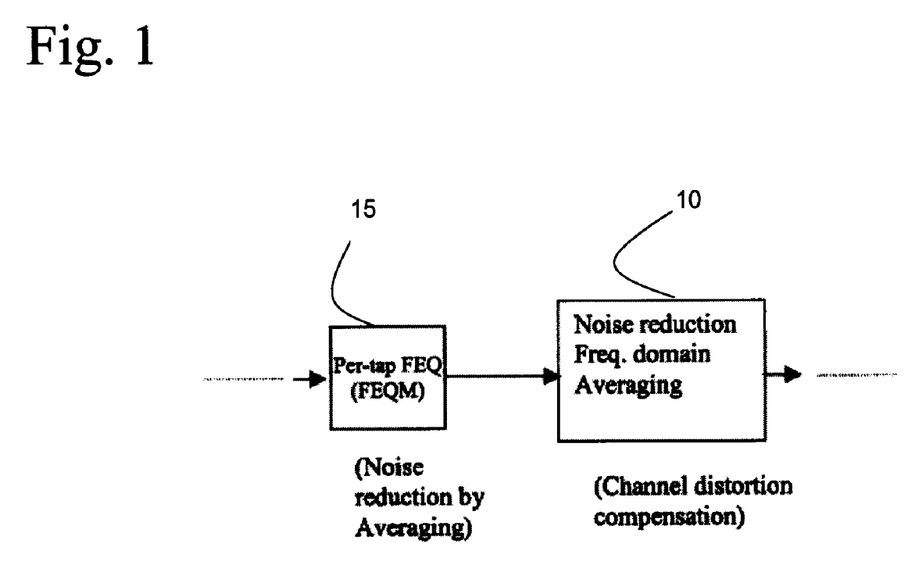
FIG. 1 is an illustrative block diagram of a two-stage SNR improvement scheme in accordance with the present invention.

As previously described, averaging can improve performance by effectively reducing noise and increasing SNR. Moreover, it is desirable to boost the signal level on suppressed subcarriers so that they can carry some data. As shown with reference to FIG. 1, a two-stage approach is suggested. A channel distortion compensation stage 10 and a stage to alleviate the effects of random noise 15 are suggested. A powerful time or frequency domain equalizer is suggested to mitigate the channel attenuation effects.

Figure 2:
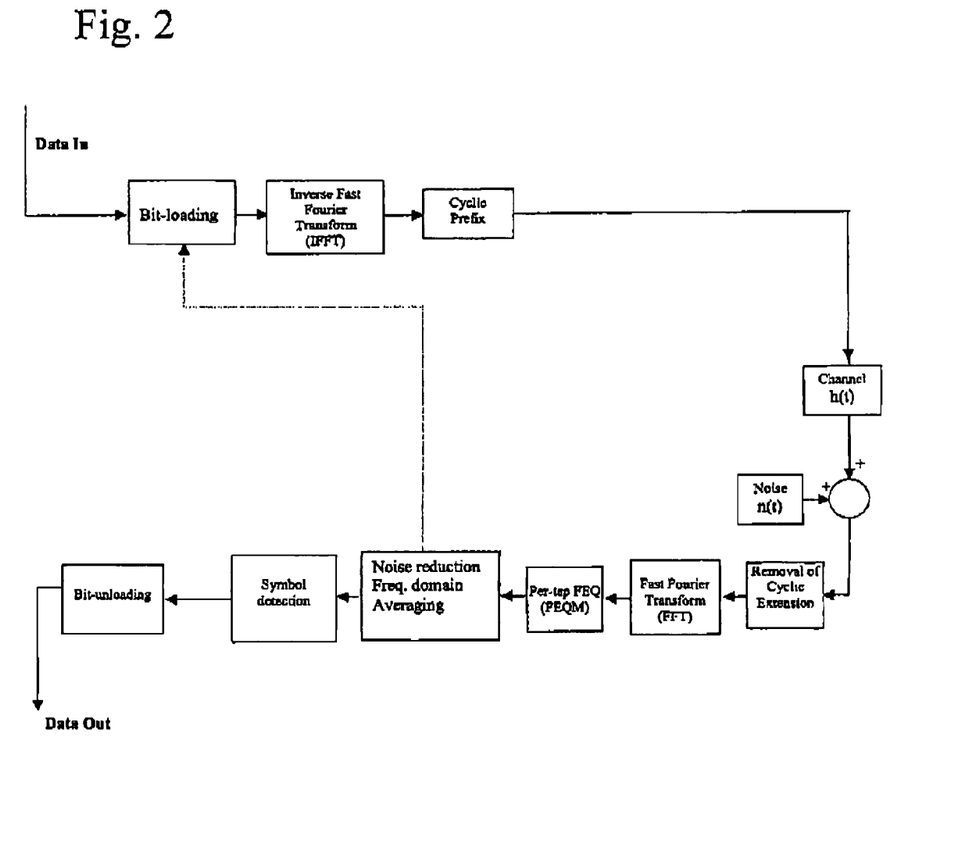
FIG. 2 is an illustrative example of a DMT based DSL system incorporating the noise reduction mechanism in accordance with the present invention.

Theoretically, with extremely good equalization, the proposed scheme can indeed improve the SNR and thus increase the throughput. With reference to FIG. 2, a DMT based DSL system with noise reduction mechanism 20 is shown. In the first phase of transmission, the receiver is trained and link initialization takes place. Based on training, the transmitter can generate a profile of constellation size for a given subcarrier. During actual transmission, the binary signal can be mapped in PSK or QAM symbol, and loaded as per the bit loading profile 25.

In accordance with the present invention, the method of noise reduction utilizing spectral averaging is described. Consider N to be the total number of carriers, and K to be the averaging index or interval. In a given frame, K subcarriers will carry the same symbol. As such, the actual number of symbols carrier per DMT frames is given by equation (1) of FIG. 9. Assuming perfect equalization, the effect of random noise will be mitigated.

Using AWGN as random noise, the noise samples are zero mean and uncorrelated. It is also assumed that the noise is stationary. The transmission of duplicated data over various subcarriers is quite similar to transmission of the repetitive signal. Therefore, using time-domain averaging results, effective noise variance after noise averaging is given by equation (2) of FIG. 9.

Figure 9:
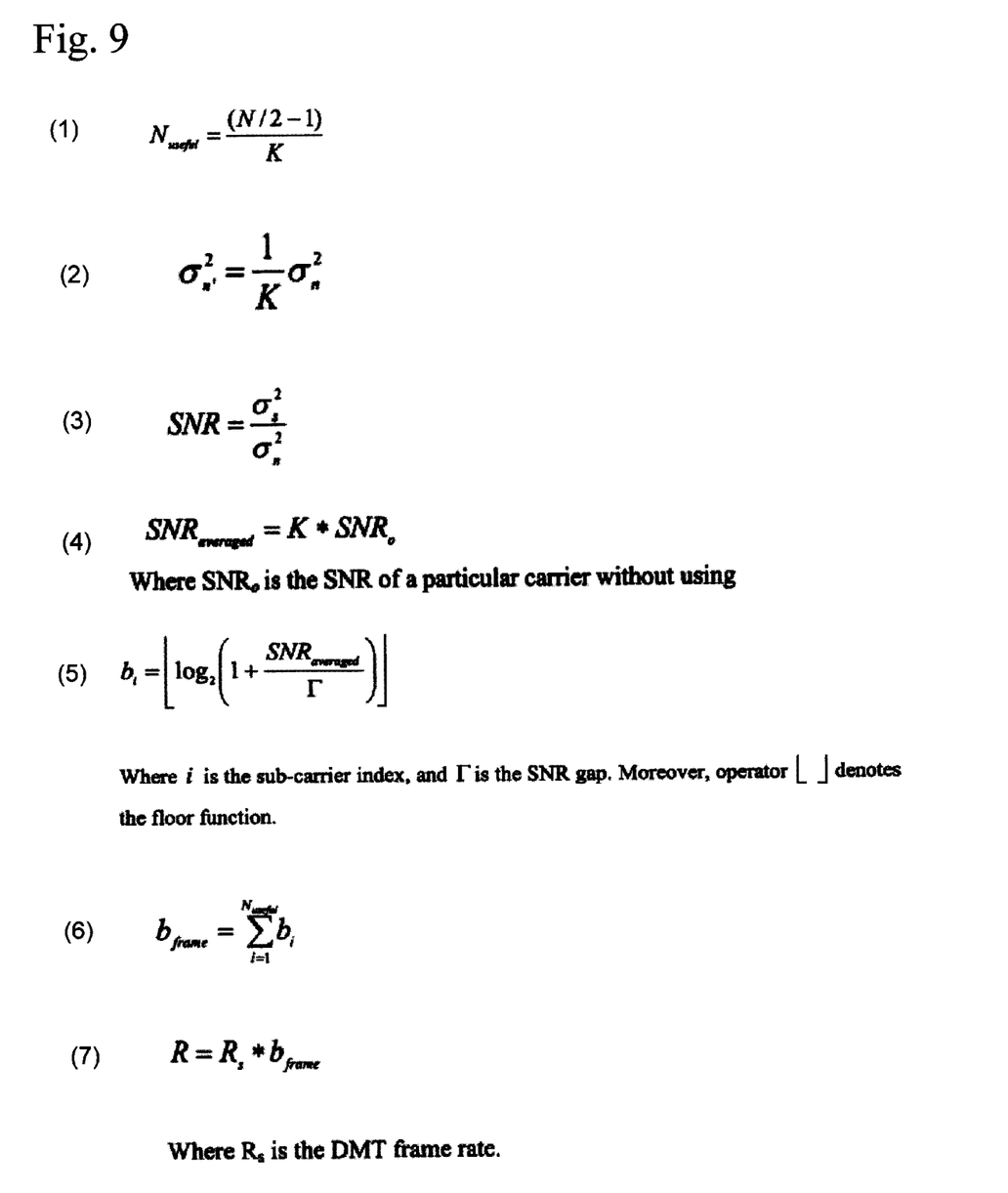
FIG. 9 is an illustration of the equations in accordance with the present invention.

Moreover, as is known in the art, the SNR can then be defined with relation to the symbol energy as shown in equation (3) of FIG. 9.

Therefore, it can be seen that the average SNR improvement for a particular subcarrier due to noise reduction will be as shown in equation (4) of FIG. 9.

For the DSL system, following the standard parameters, in terms of integer bits, the capacity of each subcarrier would be as shown in equation (5) of FIG. 9.

Therefore, the number of bits carried by a DMT frame will be as shown in equation (6) of FIG. 9.

Using DMT frame rate, throughout, R can be found as shown in equation (7) of FIG. 9.

The transmitter generated bit-loading profile ($b_i$s) and optimum value of K, based on above calculation, during the link initialization phase. This information is later used in actual data transmission.

Figure 3:
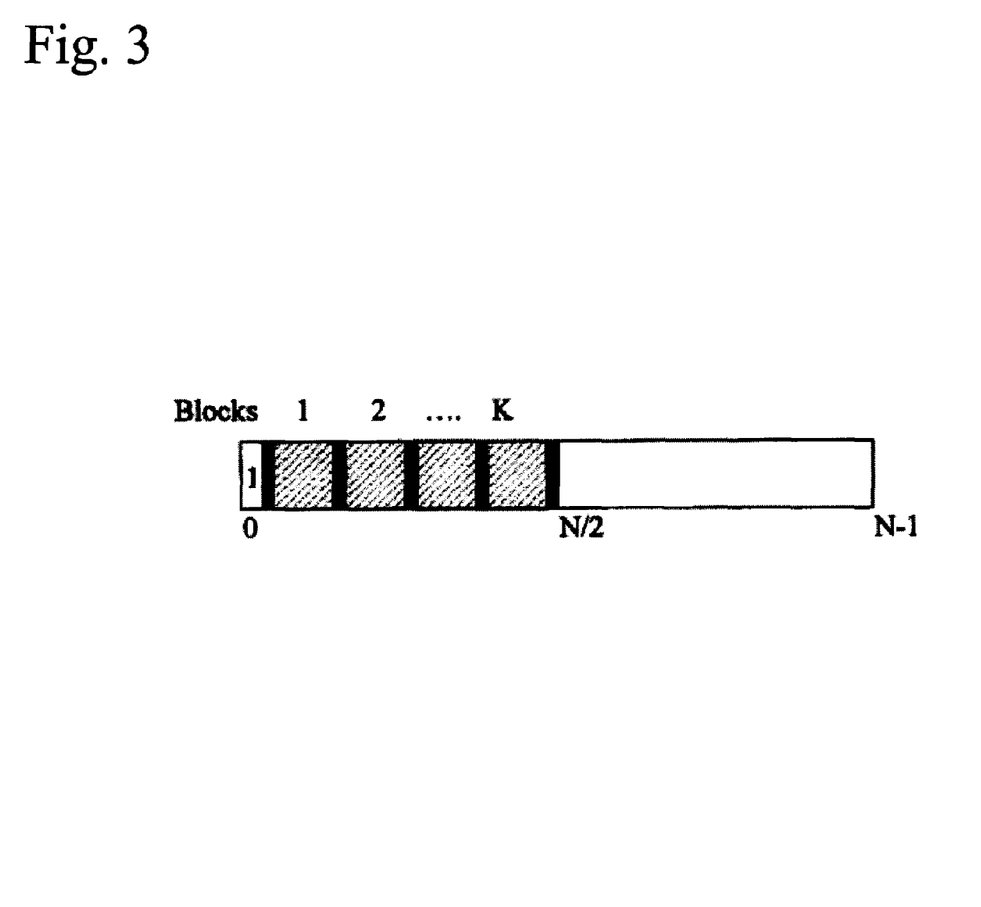
FIG. 3 is an illustrative example of a DMT frame structure when the spectral averaging algorithm in accordance with the present invention is employed.
Figure 4:
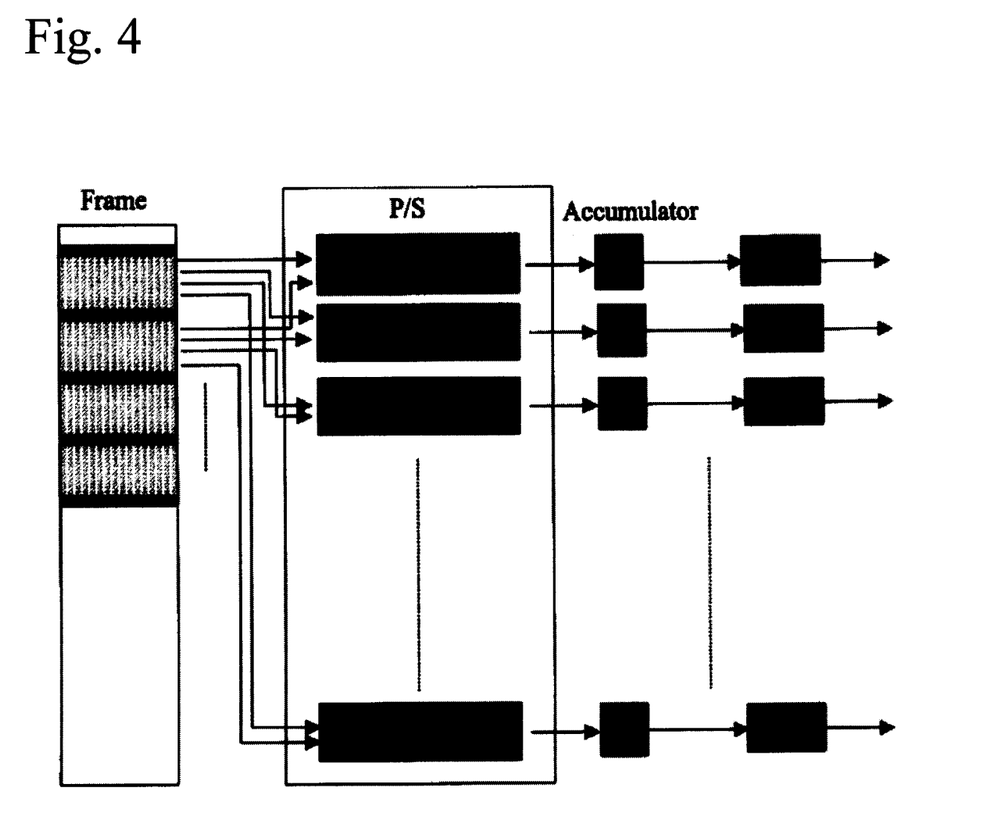
FIG. 4 is a schematic illustration of the spectral averager in accordance with the present invention.

The DMT frame structure with spectral averaging noise reduction algorithm is shown with reference to FIG. 3. At the receiver, after front-end processing, the time domain signal is transformed into frequency domain signal using FFT. As discussed previously, channel distortion can be compensated through per-tone FEQ (Frequency Domain Equalizer). The equalized signal is then fed to a pre-detection averager. Schematic block diagram of the averager is shown in FIG. 4. The averager accumulates data on pre-determined $N_{useful}$ group of sub-carriers. As a result, every DMT frame will have total of $N_{useful}$ symbols. As these symbols are noise averaged, under perfect equalization conditions, the effective SNR is increased by a factor of K. The effect of this improvement in SNR can be seen as an increment in the total number of bits per frame b and therefore, throughput R. Thus, without significant overhead, higher throughput can be achieved.

The theoretical result from equation (4) suggests that as the value of K increases, the SNR also improves linearly. In reality, due to the constraint of fixed number of subcarriers, limitation on constellation size and bandwidth, beyond certain range, larger K values would actually reduce the effective throughput.

Figure 5:
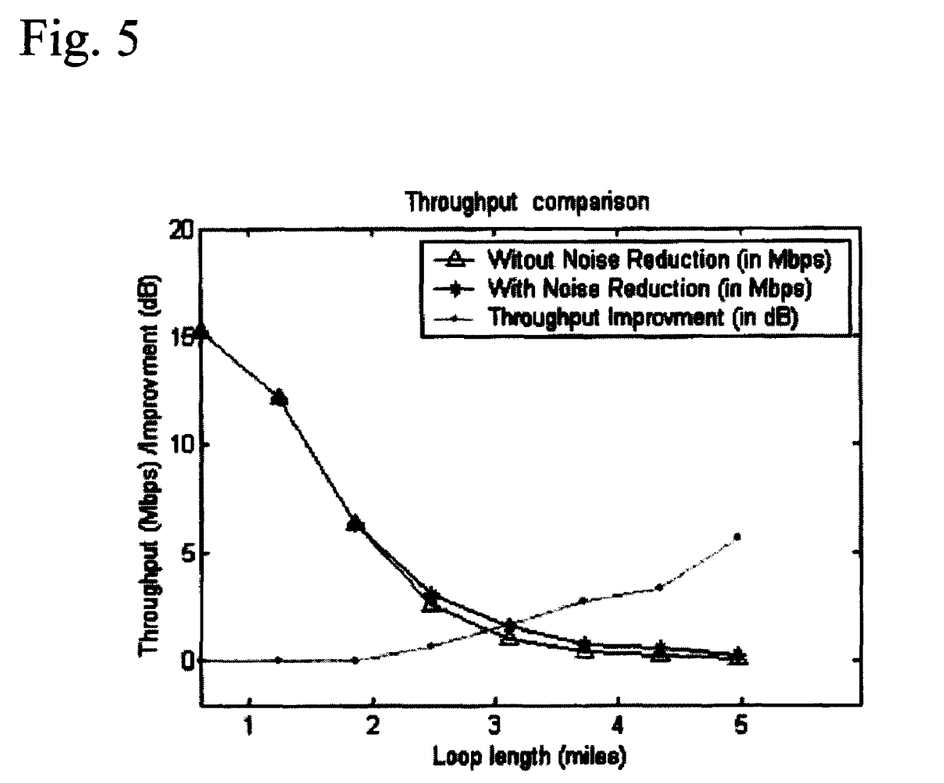
FIG. 5 is an illustration of the noise-reduction performance curves for various loops in accordance with the present invention.
Figure 6:
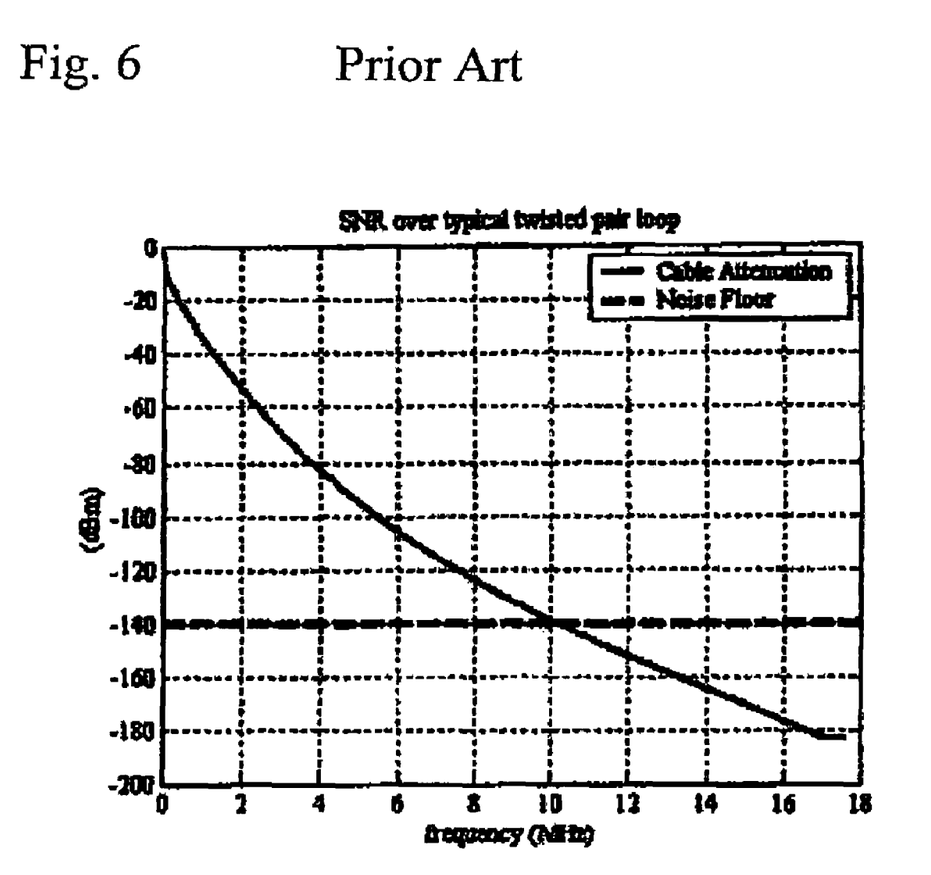
FIG. 6 is an illustration of an attenuation or SNR curve for a twisted pair loop as is known in the art.

Simulations were performed to evaluate the performance of the noise reduction scheme of the present invention. An ADSL-DMT framework together with margin adaptive water-filing algorithm for efficient utilization of the spectrum was used. The channel model was derived using LineMod package using standard loop parameters. The performance curve results are shown in FIG. 5 for various loops.

An additional embodiment of the present invention employs noise reduction through subcarrier based frame averaging in the time domain. With reference to FIG. 2, one can observe that after FFT 30 the subcarriers can be handled independently. It is one of the desirable properties of the MCM technique. By exploiting this property, the reception can be improved over individual subchannels appropriately. Typically for a transmission medium such as twisted pair, attenuation of high frequency subcarriers is severe as the loop length increases. Without any noise reduction techniques, these subcarriers are suppressed and thus are wasted. As the spectral averaging technique in accordance with the present invention proposes, an averaging approach is provided to improve SNR over the moderately suppressed channel. Unlike the method of spectral averaging, the time domain approach accomplishes the SNR improvement through repetitive date over time. Thus, some of the suppressed subcarriers with manageable attenuation are utilized for increasing the data throughput. It can be seen that depending on the SNR conditions, we can duplicate data over several frames on certain subcarriers and with effective cross-talk cancellation and equalization, average out the effect of noise.

Figure 7:
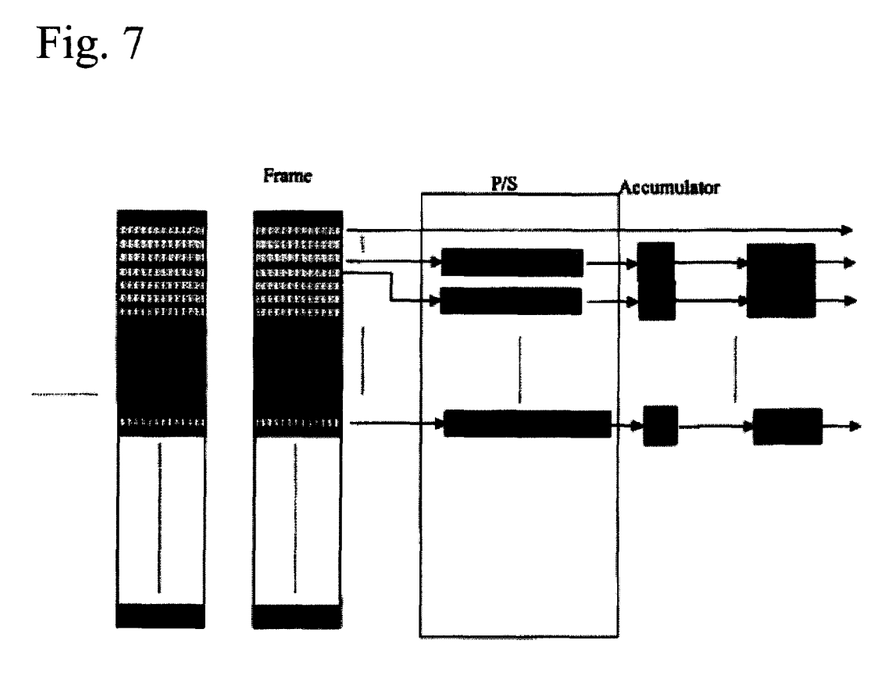
FIG. 7 is a schematic illustration of a subcarrier-based averager in accordance with the present invention.

At the receiver, after the FFT, the subcarriers can be treated separately. Moreover, the SNR of each sub-channel can be improved independently. As shown in FIG. 7, for a typical twisted paid channel, given the power spectral density and wide band power constraint, SNR of each subcarrier can be obtained. These subchannels can be analyzed as individual QAM modulated channels. In a typical DMT system, based on the SNR of the channel, bit loading is performed using certain algorithms. Essentially, during bit loading or allocation, capacity of that particular is calculated based on its SNR condition as shown by equation (8) of FIG. 10.

Therefore, when the SNR is found to be extremely low which is common in case of severely attenuated or noisy sub-channels, transmission of data is entirely avoided to retain link quality. It can be easily seen that, if the channel were highly dispersive, a significant amount of subcarriers would be attenuated. This decreases the throughput of the system. Hence, if an improvement in SNR over some of these carriers can be attained, throughput can be increased. Under minimal cross-talk conditions and with powerful equalization, this noise reduction of the present invention can boost signal reception over suppressed subcarriers and thus improve system performance.

It is assumed that attenuation effects are substantially alleviated through a powerful equalizer. Additionally noise is modeled as AWGN. This is especially true in the case of long loops where crosstalk is minimal, and thermal noise is dominant. Furthermore, it is assumed that over the averaging interval, the channel is time-invariant.

As previous stated, in the presence of noise and dispersion, signals are corrupted and attenuated. As shown in FIG. 2, the present invention employs a powerful equalizer to mitigate the channel effects. For compensation of the thermal noise introduced to the signal, subcarrier based averaging in accordance with the present invention is utilized. A simple schematic diagram of the subcarrier based averaging technique is shown in FIG. 7.

In accordance with the method of the present invention, during link initialization, system parameters are obtained and channel attenuation as well as thermal noise level is detected. Based on this information, the SNR on each subcarrier of the DMT system is determined. Accordingly, severely attenuated and thus unused carriers are identified. Using this information, the cost of carrying one more bit on each subcarrier within the constellation limits is identified individually. The algorithm to accomplish this step is detailed as follows: It can be readily said that in a DMT transmission system, individually, each subcarrier encounters identical attenuation and noise conditions over a finite period. Therefore, similar to spectral averaging, averaging can be done over the signal samples received on a particular subcarrier.

Figure 10:
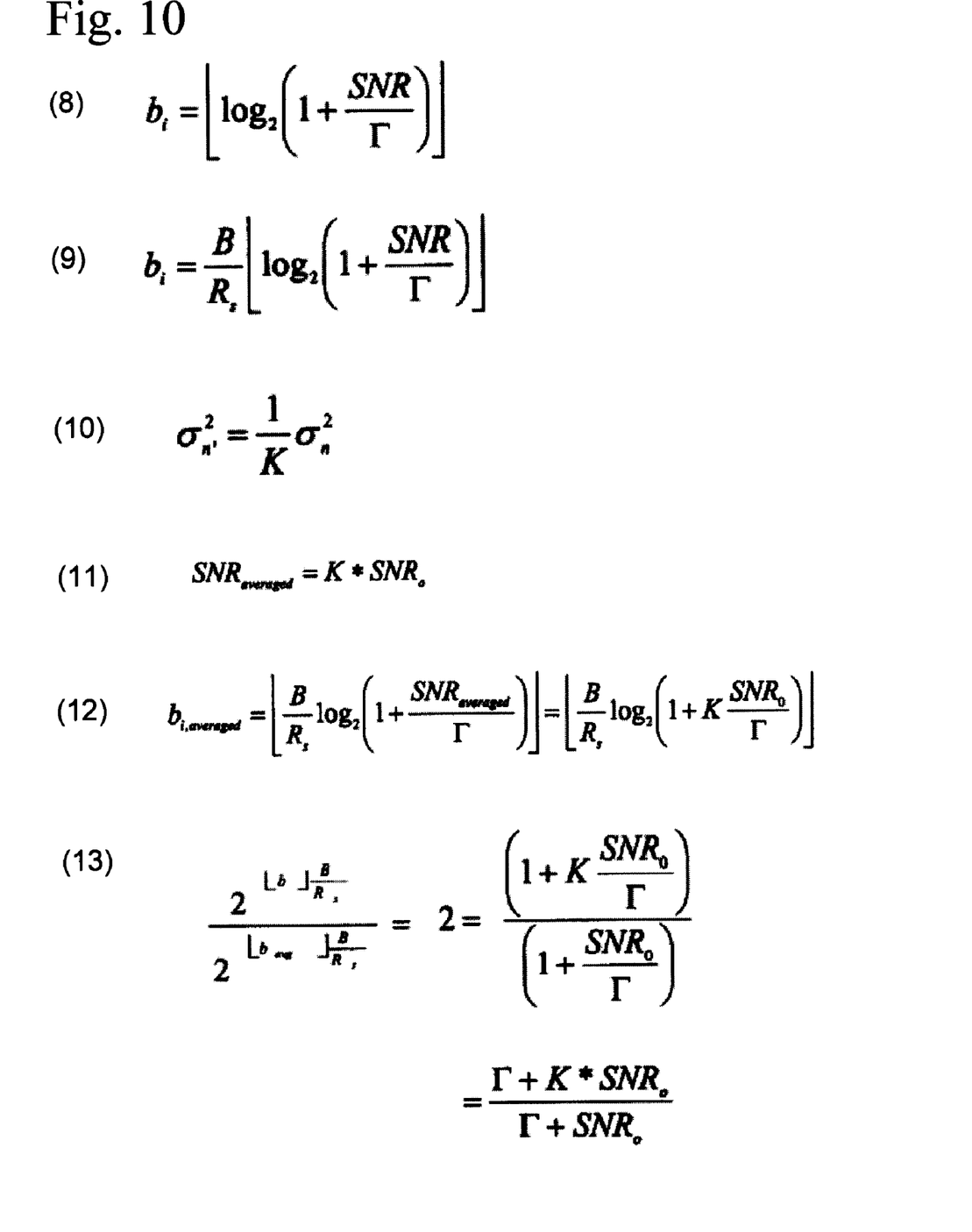
FIG. 10 is an illustration of the equations in accordance with the present invention.

As per the SNR conditions, the i-th subcarrier has bit-carrying capacity as shown by equation (9) of FIG. 10.

Recall that thermal noise can be modeled as AWGN. Therefore, time-averaging K samples received on i-th subcarrier will lower the effective noise variance by the same amount, as shown in equation (10) of FIG. 10.

Therefore, as shown in equation (4), effective SNR after averaging is improved as shown in equation (11) of FIG. 10.

As a result, due to averaging the subchannel capacity will be as shown in equation (12) of FIG. 10.

It is important to note that noise reduction will be utilized only for suppressed channels. Therefore, the proposed approach maintains the throughput at least to the same level without noise reduction.

Consider i-th suppressed subchannel capacity without averaging to be $b_i$, and with noise reduction to be $b_{i,avg}$. For the sake of simplicity, the subscript i is abandoned from the above quantities. To obtain the cost of carrying one more bit through averaging over this channel, setting $(b_{avg} b)=1$. Then it can be seen that equation (13) of FIG. 10 results.

Figure 11:
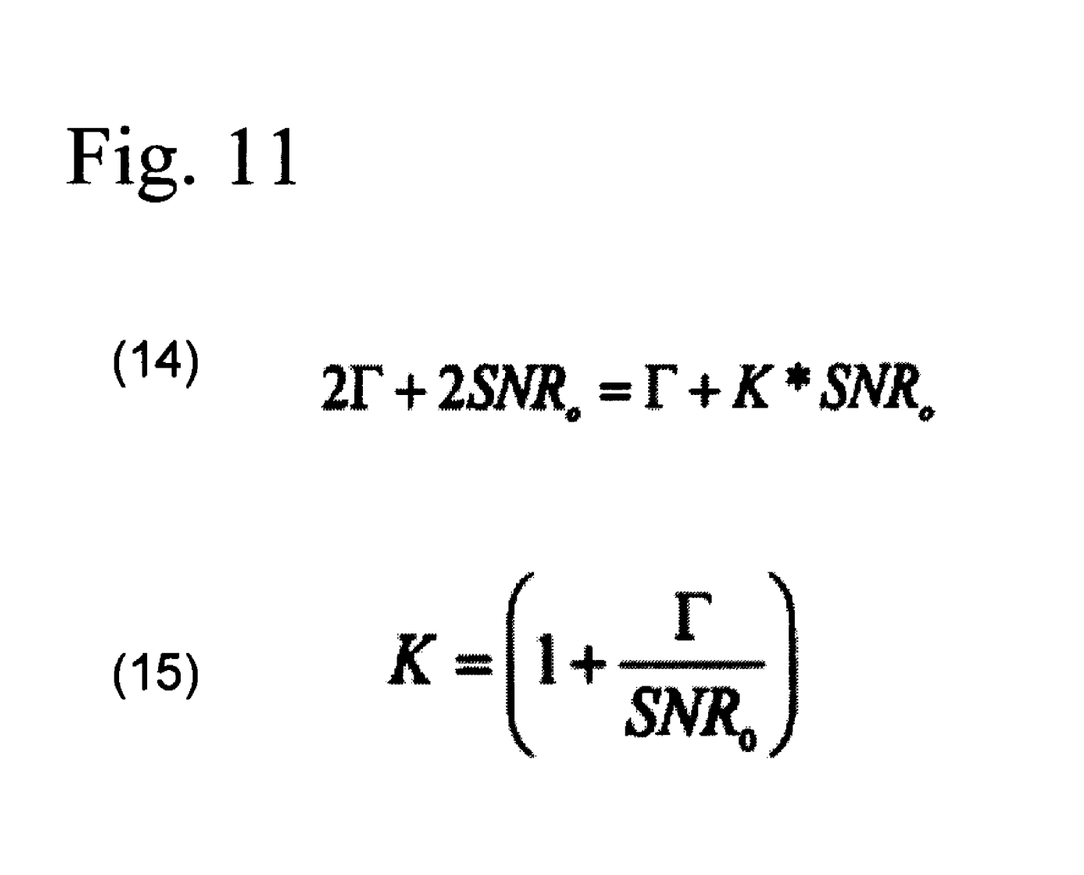
FIG. 11 is an illustration of the equations in accordance with the present invention.

Therefore, equation (14) and equation (15) of FIG. 11 result.

Essentially, this is the cost of carrying one more bit on i-th carrier. It is in terms of averaging interval or number of samples required for averaging. Clearly, it depends upon SNR conditions and system parameters. Moreover, lower the SNR, longer the averaging interval.

Based on a predetermined maximum value of K, carriers that can be enabled to carry data through noise reduction are identified. To further improve the performance, the same procedure is repeated for the selected sub-carriers to carry one more bit. After several iterations, we have a good estimate of K for each of the sub-channels.

Before a actual data transmission begins, the transmitter is informed by the receiving side about best values of K for each subchannel. The transmitter uses this information while bit loading. In fact, it repeats a symbol one a particular carrier over K frames. FIG. 7 shows an example. Similarly, at the receiver, the bit-unloading stage accumulates K samples on individual subchannels, and averages them over the same interval. Thus, prior to detection SNR will be improved.

Figure 8:
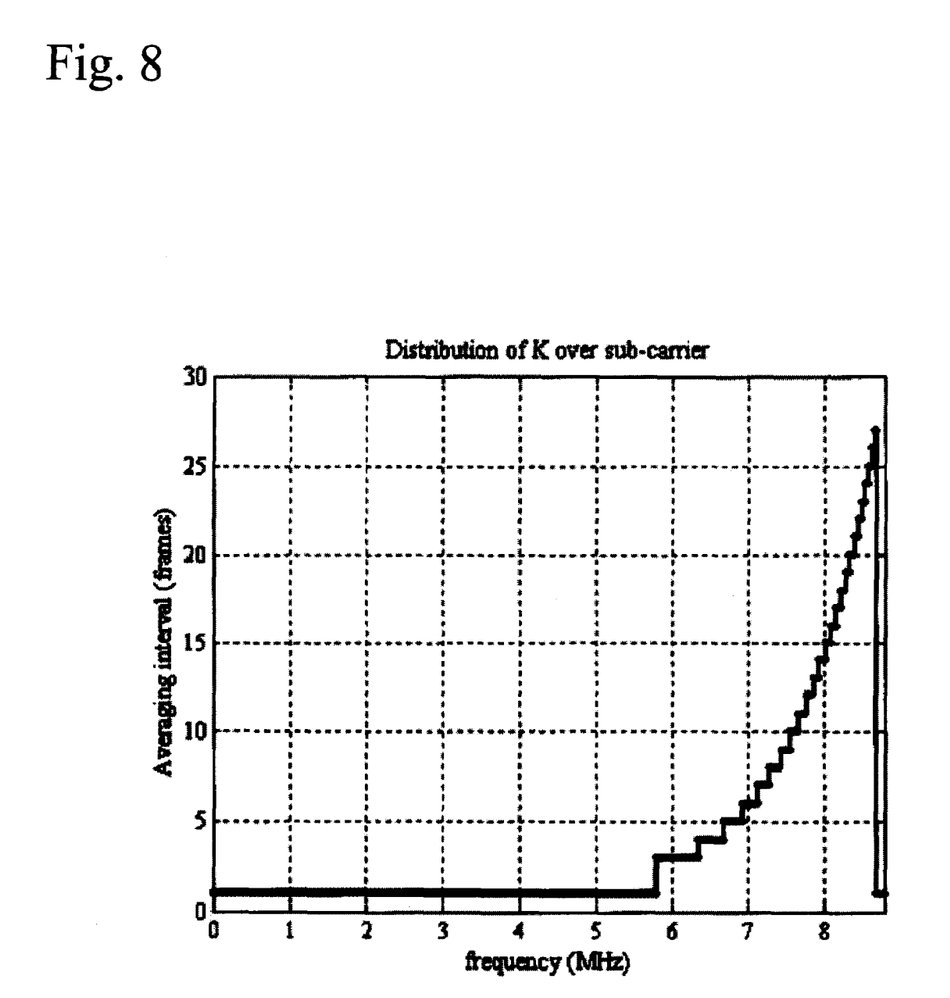
FIG. 8 is an illustration of the distribution of averaging interval for subcarrier based averaging in accordance with the present invention.

A typical DMT-DSL system examples is used her to demonstrate the technique. However, it is within the scope of the present invention to use the method and apparatus with any MCM technique. Considering a VDSL system with 6 Kft loop length, the total wideband power of both upstream and downstream to be 23 dBm, and maximum K to be 512. At the end of the first iteration, i.e. averaging interval for different subcarriers was found to be in the range of 2 to 64. The distribution of K over subcarriers is shown in FIG. 8.

In conclusion, the effective SNR of the subcarriers can be improved. In turn, this allows carrying more bits of these subcarriers and thus increases the overall throughput of the system. Without noise reduction, such subcarriers would be unusable, but trough a reasonable amount of repetition, we can improve overall link performance. Simple algorithms are proposed to estimate independent value of averaging interval over such subcarriers.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

The invention claimed is:

1. A method for improving the signal to noise ratio in a multicarrier communication system, the method comprising:
   receiving a plurality of frequency domain data signals;
   accumulating the plurality of signal data on a predetermined number of useful subcarriers;
   averaging the accumulated signal data; and
   substituting the averaged accumulated data for the received frequency domain data signals to improve the signal to noise ratio.

2. The method of claim 1 further comprising compensating for channel distortion using a per-tone frequency domain equalizer.

3. The method of claim 1 further comprising initializing a link.

4. The method of claim 1 further comprising training a receiver.

5. The method of claim 1 further comprising generating a profile of constellation size for at least one of the plurality of frequency domain data signals.

6. A method for improving the signal-to-noise ratio in a multicarrier communication system, the method comprising:

obtaining channel attenuation and thermal noise level from a plurality of subcarriers;

determining the signal-to-noise ratio for each of the plurality of subcarriers based upon the channel attenuation and thermal noise level obtained from each of the plurality of subcarriers;

finding the cost of carrying one additional bit on each of the plurality of subcarriers based upon the determined signal-to-noise ratio;

receiving a plurality of data signals; and time averaging the plurality of data signals received thereby lowering an effective noise variance of the subcarrier.

7. The method of claim 6 further comprising compensating for channel distortion using a per-tone frequency domain equalizer.

8. The method of claim 6 further comprising initializing a link.

9. The method of claim 6 further comprising training a receiver.

10. The method of claim 6 further comprising generating a profile of constellation size for at least one of the plurality of frequency domain data signals.

* * * * *